United States Patent

[11] 3,584,655

| [72] | Inventors | Bernard E. Frank<br>Rochester;<br>Howard J. Whitman, Fairport, both of, N.Y. |
|---|---|---|
| [21] | Appl. No. | 838,958 |
| [22] | Filed | July 3, 1969 |
| [45] | Patented | June 15, 1971 |
| [73] | Assignee | General Motors Corporation<br>Detroit, Mich. |

[54] COMPOSITE TUBING
10 Claims, 5 Drawing Figs.

[52] U.S. Cl. ........................................... 138/109,
138/143, 138/145, 285/322, 29/472.1, 138/170
[51] Int. Cl. ................................................ F16l 9/18,
F16l 9/22
[50] Field of Search........................................... 138/109,
142, 145, 143, 144, 146, 170, 171, 156; 285/322;
72/318, 367, 373; 29/472.1

[56] References Cited
UNITED STATES PATENTS

| 1,460,049 | 6/1923 | Ballantine | 138/143 |
| 2,014,983 | 9/1935 | Quarnstrom | 138/145 |
| 2,197,191 | 4/1940 | Nichols | 29/472.1 |
| 2,876,132 | 3/1959 | Warden | 117/50 |
| 2,982,312 | 5/1961 | Caplan | 138/145 |
| 3,012,585 | 12/1961 | O'Brien | 138/145 X |
| 3,449,937 | 6/1969 | Dimmig | 138/109 X |

*Primary Examiner*—Herbert F. Ross
*Attorneys*—J. L. Carpenter and C. K. Veenstra ABSTRACT: A composite tubing arrangement having high resistance to corrosion and mechanical damage and having certain beneficial bending characteristics is formed of a coated, brazed double wall, inner tube and a concentric, coated, welded, outer tube which tightly engages the inner tube. A flare formed on the end of the tubing arrangement has the flare seat provided on the inner tube only.

PATENTED JUN 15 1971

3,584,655

INVENTORS
Bernard E. Frank &
BY Howard J. Whitman

C.K. Veenstra
ATTORNEY

COMPOSITE TUBING

SUMMARY OF THE INVENTION

This invention relates to a composite tubing arrangement having excellent resistance to corrosion and mechanical damage and beneficial bending characteristics. While useful in a broad range of applications, this tubing appears particularly suitable for use in brake lines and fuel lines on automotive vehicles.

In the past it has been common practice to provide brake and fuel line tubing in which one or two strips of steel were formed into a double-wall arrangement. The arrangement was copper brazed to provide a sealed conduit and coated, often with a lead-tin alloy, to resist corrosion. Wire shields were wrapped around exposed portions of the line to resist mechanical damage.

This invention provides a composite tubing arrangement also offering excellent protection from corrosion and mechanical damage and advantageous bending characteristics. In this tubing, generally concentric inner and outer tubes are provided, the outer tube replacing the aforementioned wrapped wire shields and affording a barrier to corrosive or otherwise damaging elements along the entire length of the inner tube. A connecting flare is formed on the end of the tubing with the flare seat located entirely on the inner tube to provide a sealed connecting joint. When bending this composite tubing, substantial flattening of the tubing and consequent loss of flow area within the tubing is prevented and thinning of the tubing wall is reduced.

The details as well as other objects and advantages of this invention are set forth in the drawing and in the description of the preferred embodiment.

DESCRIPTION OF A PREFERRED EMBODIMENT

Figure 1:
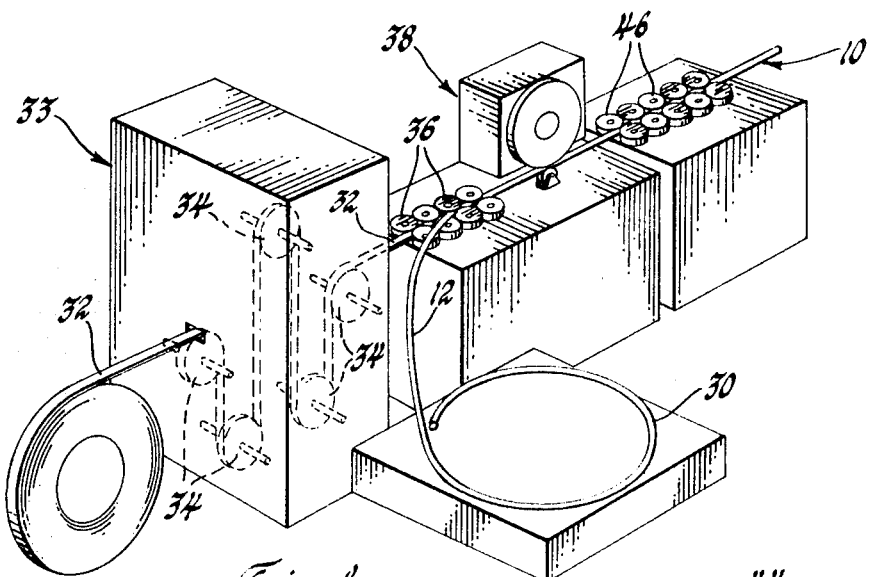
FIG. 1 is a schematic view of a portion of the manufacturing equipment for this composite tubing, showing how the outer tube may be formed about the inner tube.

Referring to the drawing, the composite tubing arrangement 10 has as its basic components an inner tube 12 and an outer tube 14.

As shown herein, inner tube 12 is made from two strips 16 and 17 of low carbon steel. Strips 16, 17 are curved transversely in interlocking relation to form a double-wall tube, each strip 16, 17 providing a portion of the inner wall 18 and a portion of the outer wall 20 and each strip 16, 17 having its outer wall portion completely overlying its inner wall portion. In this configuration, strips 16 and 17 are copper brazed to bond inner and outer walls 18 and 20 along seams 22 and to bond the edge portions 23, 24, 25 and 26, thus forming inner tube 12 into a sealed conduit.

While inner tube 12 as depicted herein is formed from two strips of steel into a brazed double-wall component in the manner generally set forth in U.S. Pat. Nos. 2,205,821 and 2,197,191, other configurations may also be useful in a composite tubing arrangement. As examples, we mention welded tubing and brazed double-wall tubing formed from a single strip of steel.

In some applications, it may be desirable to coat the exterior surface 28 of inner tube 12 to provide protection against corrosion. Two coatings which have proven very advantageous for this purpose are the lead-tin alloys known in the industry as "Terne" (minimum of 7 percent tin, balance lead) and "Super Terne" (minimum of 12 percent tin, balance lead). These coatings may be applied as set forth, for example, in U.S. Pat. No. 2,876,132. Other coatings which appear advantageous in some applications include aluminum-zinc alloys, as set forth, for example, in U.S. Pat. No. 2,982,312, and plastics, greases and tars.

After formation, inner tube 12 is disposed in a coil 30 (as shown in FIG. 1) for incorporation into the composite tubing. An additional strip 32 of low carbon steel is fed through a looper 33, having a plurality of rollers 34 which regulate the passage of strip 32, and a plurality of forming rollers 36. As strip 32 passes through forming rollers 36, it is curved transversely into a tubular configuration. Inner tube 12 is fed adjacent strip 32 as strip 32 passes through forming rollers 36 so that outer tube 14 is formed about inner tube 12.

Figure 5:
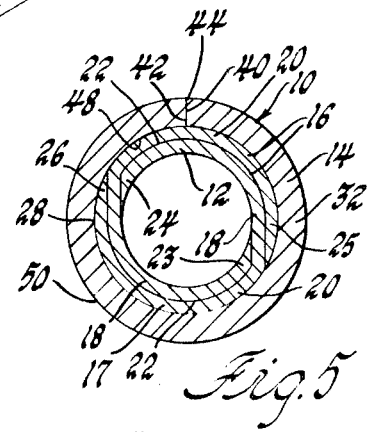
FIG. 5 is a sectional view along line 5—5 of FIG. 4, further enlarged to show the construction of the inner and outer tubes.

Composite tubing 10 then passes through a welding station 38 wherein the opposite edges 40 and 42 of strip 32 (FIG. 5) are welded into a seam 44, thus sealing outer tube 14 about inner tube 12. For some applications, it may be desirable to machine away the weld bead formed at seam 44 following this stage of manufacture; such a step is not essential, however.

Composite tubing 10 subsequently passes through a plurality of rollers 46 which reduce the diameter of outer tube 14, squeezing the interior surface 48 of outer tube 14 tightly against the coated exterior surface 28 of inner tube 12.

The durability of the resulting composite tubing arrangement 10 can be appreciated from the foregoing description. Outer tube 14 protects inner tube 12 from mechanical damage which could otherwise occur if it were struck by a hard object. Moreover, outer tube 14 is available as a backup conduit in the unlikely event of failure of inner tube 12. Outer tube 14 also provides a barrier against corrosion of inner tube 12. And should localized corrosion of outer tube 14 occur, the tight engagement of outer and inner surfaces 28 and 48 of inner and outer tubes 12 and 14 will inhibit corrosion of inner tube 12 by reducing the opportunity for corrosive elements to traverse and attack a large area of the outer surface 28 of inner tube 12.

To minimize corrosion of outer tube 14, it may be advantageous in some applications to coat its outer surface 50; the "Terne" and "Super Terne" lead-tin alloys and the aluminum-zinc alloys appear particularly suitable for this purpose.

Figure 2:
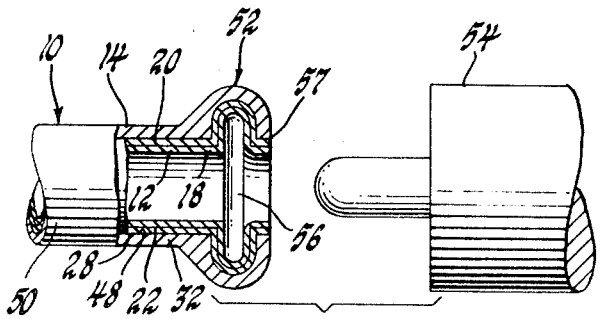
FIGS. 2 and 3 schematically show intermediate steps in the formation of a flare on the end portion of the tubing.
Figure 3:
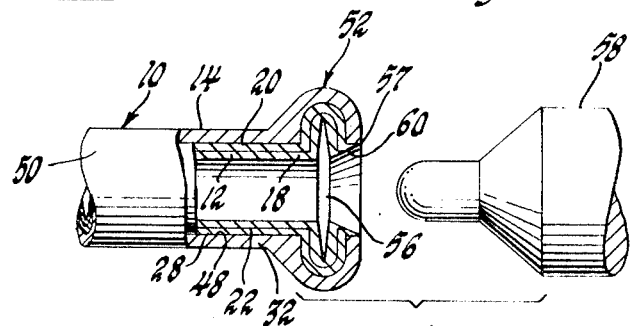
Figure 4:
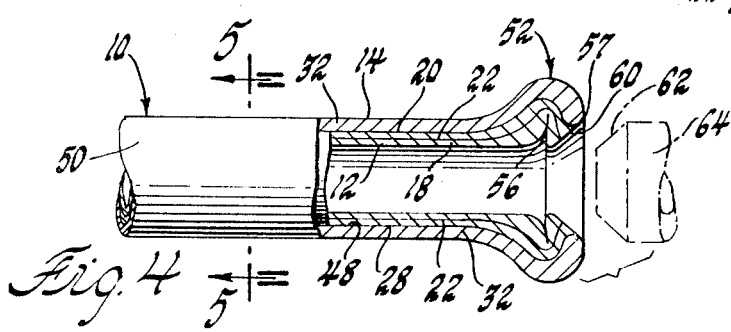
FIG. 4 is an enlarged view, partially in section, of the end portion of the tubing, also indicating the relationship of the flare seat to a fitting.

After tubing 10 has been cut to align the ends of inner and outer tubes 12 and 14, a flare 52 is formed on one or both ends of the tubing to provide a strong connecting portion. As illustrated by FIGS. 2, 3 and 4, flare 52 is formed in a two-step process: First, tubing 10 is upset by a blunt 54 to radially expand and axially compress inner and outer tubes 12 and 14 at a location 56 immediately adjacent the end 57 of tubing 10. Then a tapered tool 58 further compresses tubing 10 about the location 56 and provides a tapered, frustoconical flare seat 60 on inner tube 12.

Flare seat 60 is adapted to engage a tapered portion 62 of a fitting 64 to provide a sealed joint. By providing flare seat 60 only on inner tube 12, weld seam 44 on outer tube 14 will not interfere with the seal between flare seat 60 and fitting 64. The provision of flare seat 60 on inner tube 12 is also advantageous since failure of outer tube 14 will not create a leak at the joint between flare seat 60 and fitting 64.

While inner surface 48 of outer tube 14 should firmly engage outer surface 28 of inner tube 12 along the end of tubing 10 to provide a strong flare 52, in some applications an enclosed air space may be advantageously provided between inner and outer tubes 12 and 14 at an intermediate portion of the tubing. The enclosed air space would add resiliency to outer tube 14 and could reduce the incidence of mechanical damage to outer tube 14.

When bending composite tubing 10, outer tube 14 prevents flattening of inner tube 12 and the loss of flow area through the conduit which could otherwise occur, while inner tube 12 acts as a bending arbor for outer tube 14. Inner and outer tubes 12 and 14 further cooperate during the bending operation to reduce the bending stresses on inner tube 12 and to prevent thinning of the walls of the tubing.

We claim:

1. A composite corrosion resistant tubing arrangement comprising an inner tube in which a pair of strips of steel are curved transversely to form a double-wall tube having an inner wall and an outer wall completely overlying said inner wall, in which each of said strips form a portion of said outer wall and a portion of said inner wall, and in which said strips are copper brazed each to the other to form a sealed conduit, a lead-tin alloy coating on the exterior surface of said inner tube to protect said inner tube against corrosion, an outer tube disposed about and coterminous with said inner tube in which a further strip of steel curved transversely about said inner tube completely overlying said inner tube to protect said inner tube against mechanical damage and bending stress and to further protect said inner tube against corrosion, in which the transverse edges of said strip are welded together to seal said outer tube about said inner tube, and in which the interior surface of said outer tube tightly engages the coated exterior surface of said inner tube along their entire respective lengths to inhibit passage of corrosive elements between said inner and outer tubes, a lead-tin alloy coating on the exterior surface of said outer tube to protect said outer tube against corrosion, and a flared connecting portion formed on each end of such composite tubing arrangement in which said inner and outer tubes are radially expanded at locations immediately adjacent each end of the tubing arrangement and axially compressed at said locations and provide an enlargement on each end of the tubing arrangement and in which each end of said inner tube has a frustoconical flare seat for providing a sealed connecting joint.

2. A composite tubing arrangement comprising an inner steel tube having a pair of strips of steel curved transversely to form a double-wall tube having an inner wall and an outer wall completely overlying said inner wall, in which each of said strips form a portion of said outer wall and a portion of said inner wall, an outer steel tube disposed about said inner tube to protect said inner tube against mechanical damage, such tubing arrangement having an end portion in which one end of said outer tube and one end of said inner tube terminate in a common plane and in which the interior surface of said outer tube tightly engages the exterior surface of said inner tube, and a flared connecting portion formed on said end portion in which said inner and outer tubes are radially expanded at a location immediately adjacent said ends of said inner and outer tubes and axially compressed at said location and provide an enlargement on said end portion and in which said end of said inner tube has a frustoconical flare seat for providing a sealed connecting joint.

3. The composite tubing arrangement of claim 2 which further comprises a coating on the exterior surface of said inner tube to protect said inner tube against corrosion.

4. The composite tubing arrangement of claim 3 wherein said coating is a lead-tin alloy.

5. The composite tubing arrangement of claim 3 wherein said coating is an aluminum-zinc alloy.

6. The composite tubing arrangement of claim 2 which further comprises a coating on the exterior surface of said outer tube to protect said outer tube against corrosion.

7. The composite tubing arrangement of claim 6 wherein said coating is a lead-tin alloy.

8. The composite tubing arrangement of claim 6 wherein said coating is an aluminum-zinc alloy.

9. The composite tubing arrangement of claim 2 which further comprises first and second coatings on the exterior surfaces of said inner and outer tubes respectively to protect said inner and outer tubes against corrosion.

10. A composite tubing arrangement comprising an inner tube in which a pair of strips of steel are curved transversely to form a double-wall tube having an inner wall and an outer wall completely overlying said inner wall, in which each of said strips form a portion of said outer wall and a portion of said inner wall, and in which said strips are copper brazed each to the other to form a sealed conduit, an outer tube formed about said inner tube in which a further strip of steel is curved transversely completely about said inner tube to protect said inner tube and in which the transverse edges of said further strip are welded together to seal said outer tube about said inner tube, such tubing arrangement having an end portion in which one end of said outer tube and one end of said inner tube terminate in a common plane and in which the interior surface of said outer tube tightly engages the exterior surface of said inner tube, and a flared connecting portion formed on said end portion in which said inner and outer tubes are radially expanded at a location immediately adjacent said ends of said inner and outer tubes and axially compressed at said location and provide an enlargement on said end portion and in which said end of said inner tube has a frustoconical flare seat for providing a sealed flare joint.